(12) United States Patent
Maeng et al.

(10) Patent No.: US 11,227,412 B2
(45) Date of Patent: Jan. 18, 2022

(54) ARTIFICIAL INTELLIGENCE APPARATUS FOR CALIBRATING COLOR OF DISPLAY PANEL OF USER AND METHOD FOR THE SAME

(71) Applicant: LG ELECTRONICS INC., Seoul (KR)

(72) Inventors: Jichan Maeng, Seoul (KR); Beomoh Kim, Seoul (KR); Taehyun Kim, Seoul (KR); Wonho Shin, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 16/493,692

(22) PCT Filed: Jul. 5, 2019

(86) PCT No.: PCT/KR2019/008317
§ 371 (c)(1),
(2) Date: Sep. 12, 2019

(87) PCT Pub. No.: WO2017/126757
PCT Pub. Date: Jul. 27, 2017

(65) Prior Publication Data
US 2020/0035195 A1    Jan. 30, 2020

(51) Int. Cl.
*G06T 7/90*    (2017.01)
*G09G 5/02*    (2006.01)
(Continued)

(52) U.S. Cl.
CPC ............. *G06T 7/90* (2017.01); *G06T 7/0002* (2013.01); *G09G 5/02* (2013.01);
(Continued)

(58) Field of Classification Search
CPC ............... G09G 5/02; G09G 2300/026; G09G 2320/0693; G09G 2380/02; G06T 7/90;
(Continued)

(56) References Cited

U.S. PATENT DOCUMENTS 7,457,458 B1    11/2008  Daniel et al.
8,666,455 B2 *  3/2014  Song ................. H04M 1/72448
                                                            455/566
(Continued)

FOREIGN PATENT DOCUMENTS

| JP | 2017135554 | 8/2017 |
| KR | 1020180042030 | 4/2018 |
| WO | 2018211350 | 11/2018 |

OTHER PUBLICATIONS

PCT International Application No. PCT/KR2019/008317, Written Opinion of the International Searching Authority dated Apr. 2, 2020, 9 pages.

*Primary Examiner* — Yu Chen
(74) *Attorney, Agent, or Firm* — Lee, Hong, Degerman, Kang & Waimey PC

(57) ABSTRACT

An artificial intelligence apparatus for calibrating a color of a display panel includes a camera configured to capture an image displayed by the display panel; and a processor configured to: transmit a signal for outputting a color reference image to the display panel, receive, via the camera, a captured image for the display panel, calculate a color offset for the display panel in a predetermined unit based on the color reference image and the captured image, determine an output color calibration value for the display panel using the calculated color offset, and transmit the determined output color calibration value to the display panel.

14 Claims, 16 Drawing Sheets

(51) Int. Cl.
*G06T 7/00* (2017.01)
*G09G 3/00* (2006.01)

(52) U.S. Cl.
CPC ............... *G06T 2207/10024* (2013.01); *G06T 2207/20081* (2013.01); *G06T 2207/20084* (2013.01); *G09G 3/035* (2020.08); *G09G 2300/026* (2013.01); *G09G 2320/0693* (2013.01)

(58) Field of Classification Search
CPC ......... G06T 7/0002; G06T 2207/10024; G06T 2207/20081; G06T 2207/20084
See application file for complete search history.

(56) References Cited

U.S. PATENT DOCUMENTS

| | | | |
|---|---|---|---|
| 2009/0096804 A1 | 4/2009 | Gerets et al. | |
| 2015/0213771 A1* | 7/2015 | Ohnishi | G01J 3/46 345/88 |
| 2016/0155389 A1* | 6/2016 | Beon | G06F 3/1446 345/690 |
| 2016/0180801 A1* | 6/2016 | Lee | G09G 5/003 345/156 |
| 2017/0213322 A1 | 7/2017 | Chino | |
| 2017/0330348 A1* | 11/2017 | Park | H04N 9/735 |
| 2018/0367773 A1* | 12/2018 | Holub | G09G 5/02 |
| 2019/0279044 A1* | 9/2019 | Vasisht | G06N 20/00 |
| 2020/0175337 A1* | 6/2020 | Ho | G06K 9/623 |
| 2020/0184905 A1* | 6/2020 | Park | G06T 7/0002 |
| 2020/0219467 A1* | 7/2020 | Okamoto | G06F 3/1446 |

\* cited by examiner

ARTIFICIAL INTELLIGENCE APPARATUS FOR CALIBRATING COLOR OF DISPLAY PANEL OF USER AND METHOD FOR THE SAME

CROSS-REFERENCE TO RELATED APPLICATIONS

This application is the National Stage filing under 35 U.S.C. 371 of International Application No. PCT/KR2019/008317, filed on Jul. 5, 2019, the contents of which are hereby incorporated by reference herein in its entirety.

TECHNICAL FIELD

The present disclosure relates to an artificial intelligence apparatus for calibrating a color of a display panel and a method for the same. Specifically, the present disclosure relates to an artificial intelligence apparatus for calibrating a color of a display panel, which calibrates the color of the display panel by capturing an image output from the display panel to eliminate color distortion between a plurality of display panels or between display elements in a single display, and a method for the same.

BACKGROUND ART

Recently, display devices are implemented not only as TVs or monitors, but also as various devices such as a digital signage or an outdoor signboard, and the range of use for the display devices has been extensively increased. In particular, cases in which one large display is formed by connecting a plurality of display panels are increased.

However, when a plurality of display panels are used to constitute a single large display, distortion may occur in an output image due to the mismatch of a color or a position between the display panels. In addition, even in a display composed of a single display panel, the distortion may occur in the output image due to the mismatch of the color between output elements. Further, a flexible display may cause the distortion in an image observed by a user due to the bending of the display even if there is no distortion in an image which is actually output.

Therefore, it is necessary to provide a technique for calibrating/correcting a display panel such that the distortion does not occur in an image actually observed by a user.

DISCLOSURE OF THE INVENTION

Technical Problem

Embodiments provide an artificial intelligence apparatus and a method for calibrating a color of a display panel such that color distortion does not occur in an image output from a display panel observed by a user.

Embodiments also provide an artificial intelligence apparatus and a method for calibrating a color of a display panel such that color distortion does not occur between a plurality of display panels or between display elements of a single display panel.

Technical Solution

In one embodiment, an artificial intelligence apparatus and a method for calibrating a color of a display panel are configured to output a color calibration image to the display panel, receive, via a camera, a captured image for the display panel, calculate a color offset for the display panel in a predetermined unit based on a reference image and the captured image, determine an output color calibration value for the display panel using the color offset, and transmit the output color calibration value to the display panel.

In another embodiment, an artificial intelligence apparatus and a method for calibrating a color of a display panel are configured to convert a captured image into a standardized image corresponding to standard context information by using context information corresponding to a capturing time point of the captured image, and calculate a color offset using the standardized image.

Advantageous Effects

According to various embodiments, a user may observe an image output from a display panel without distortion of a color.

In addition, according to various embodiments, even if an environment changes when capturing a display panel, distortion is automatically determined in consideration of the change, thereby increasing the accuracy of the distortion determination.

Further, according to various embodiments, a display panel can be automatically calibrated without intervention of a user, thereby reducing the cost and effort for maintenance of display devices.

MODE FOR CARRYING OUT THE INVENTION

Figure 1:
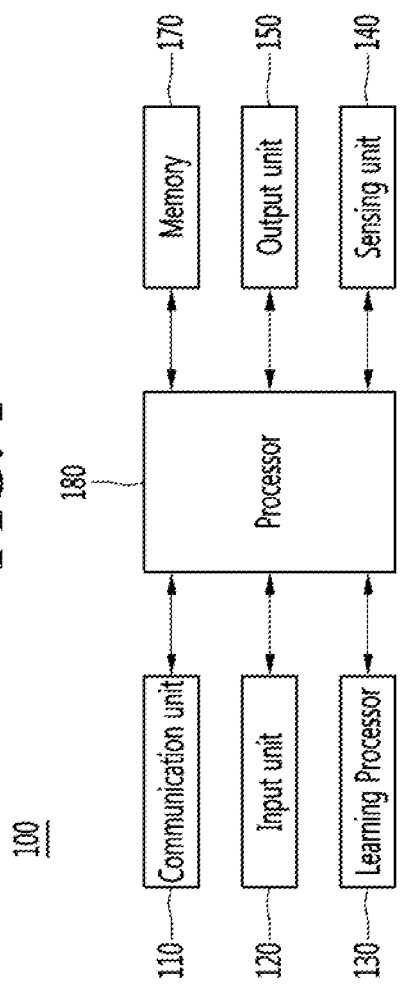
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may refer to a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method for learning an artificial neural network in a state in which a label for training data is given, and the label may refer to the correct answer (or result value) that the artificial neural network must infer when the training data is input to the artificial neural network. The unsupervised learning may refer to a method for learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to refer to deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
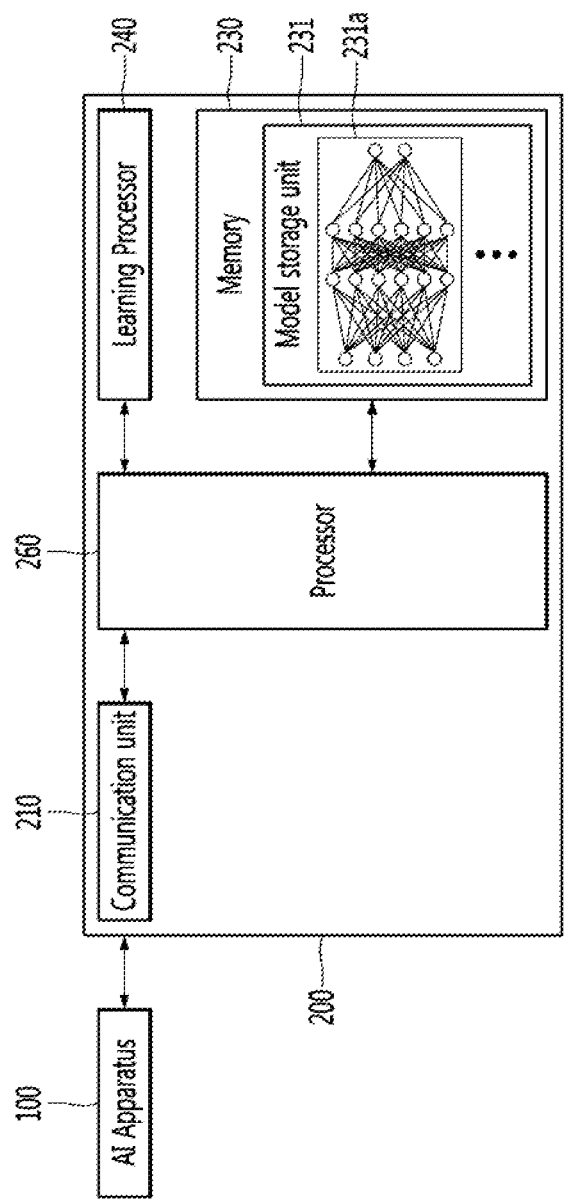
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
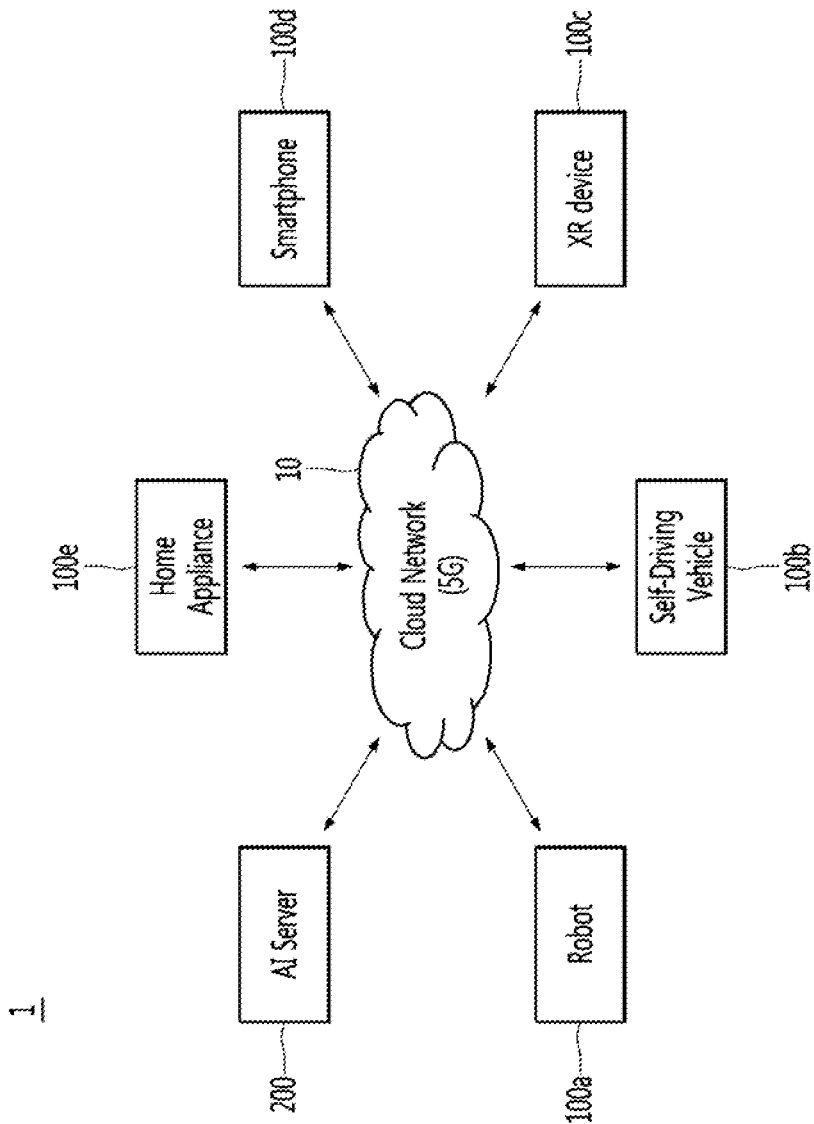
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, or the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. Here, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
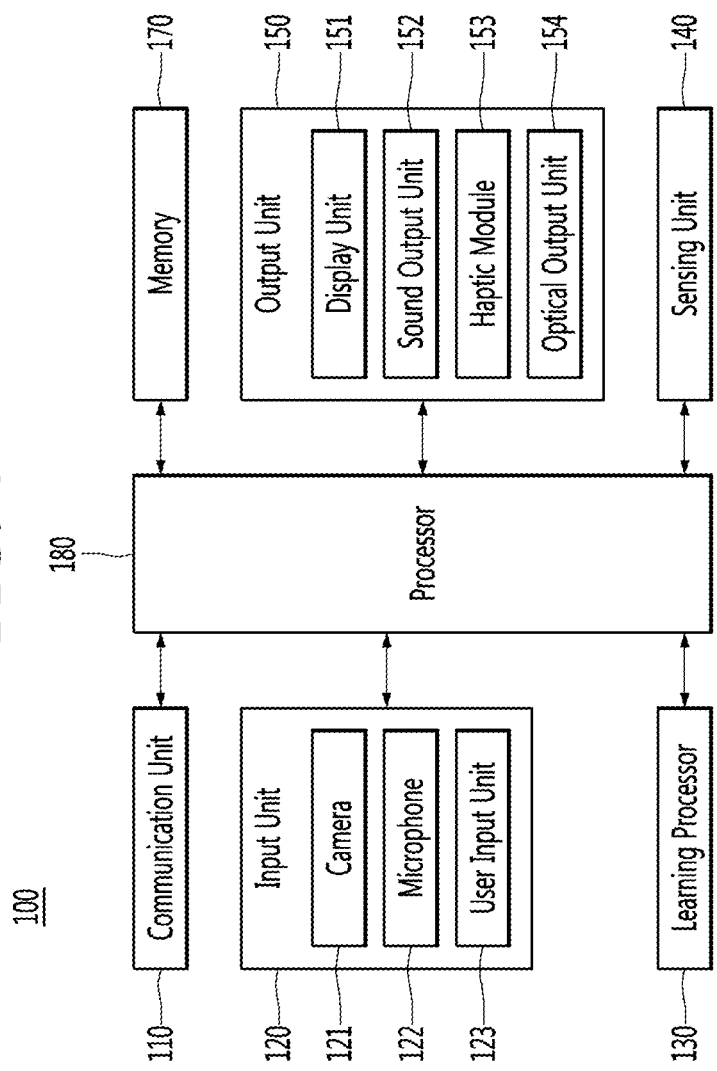
FIG. 4 is a block diagram illustrating an AI apparatuses according to an embodiment of the present invention.

FIG. 4 is a block diagram illustrating an AI apparatus according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
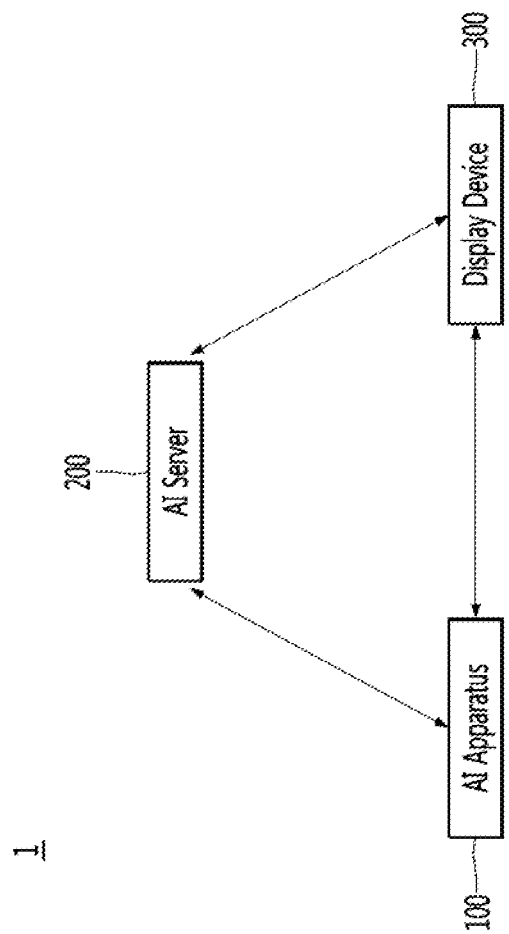
FIG. 5 is a view illustrating an AI system according to an embodiment of the present invention.

FIG. 5 is a view illustrating an AI system 1 according to an embodiment of the present invention.

Referring to FIG. 5, an AI system 1 according to one embodiment may include an AI apparatus 100, an AI server 200, and a display device 300.

At least one of the AI apparatus 100, the AI server 200, or the display device 300 may communicate with each other using a wired or wireless communication technology.

Here, the devices 100, 200, and 300 may communicate with each other through a base station, a router, or the like, but may directly communicate with each other using a short-range communication technology.

For example, the devices 100, 200, 300 may communicate with each other directly or through a base station using 5G (5$^{th}$ generation) communication.

The AI device 100 may determine whether distortion occurs with respect to the display panel of the display device 300, determine setting values for calibrating the distortion, and transmit the determined setting values to the display device 300 in order to correct the distortion of the display panel of the display device 300.

The distortion of the display panel may include color distortion or position distortion of the display panel.

The color distortion of the display panel may refer to a color distortion between display panels when a plurality of display panels are connected to form one display panel, but may occur between display elements within one display panel.

In particular, in a flexible display panel, even if there is no color distortion in each display element, an observer may be observed that there is a color distortion due to the bending of the display panel, which is also referred to as the color distortion.

The color distortion of the display panel may include color temperature distortion or luminance distortion.

Similarly, when a plurality of display panels are connected to form one display panel group, the position distortion of the display panel may refer to the distortion of arrangement or alignment between the display panels. Hereinafter, the display panel includes a display panel group unless otherwise specified.

The AI device 100 may determine the color distortion or the position distortion existing on the display panel by using the captured image for the display panel of the display device 300, determine a calibration value for correcting the distortion, and transmit the calibration value to the display device 300. In addition, the AI device 100 may again recalibrate the display panel by using the captured image for the display panel of the display device 300.

Here, the AI device 100 may be a fixed device, but may be a robot that can move, such as a robot cleaner or a guide robot.

The AI server 200 may receive data to be used to calibrate the display panel of the display device 300 from the AI device 100, and determine setting values for calibrating the display panel based on the received data.

The display device 300 may include a display panel, a processor (or a display controller) and a communication unit, and output an image through the display panel.

The display device 300 may include a rollable display, a flexible display, a micro LED display, an LCD, and the like.

In FIG. 5, the AI device 100 and the display device 300 are illustrated as being separated from each other, but the present disclosure is not limited thereto. That is, according to another embodiment, the AI device 100 may refer to a display device having an AI function, and the AI device 100 and the display device 300 illustrated in FIG. 5 may be configured as one. In this case, a processor 180 of the AI device 100 may control its display panel or a display unit 151.

Figure 6:
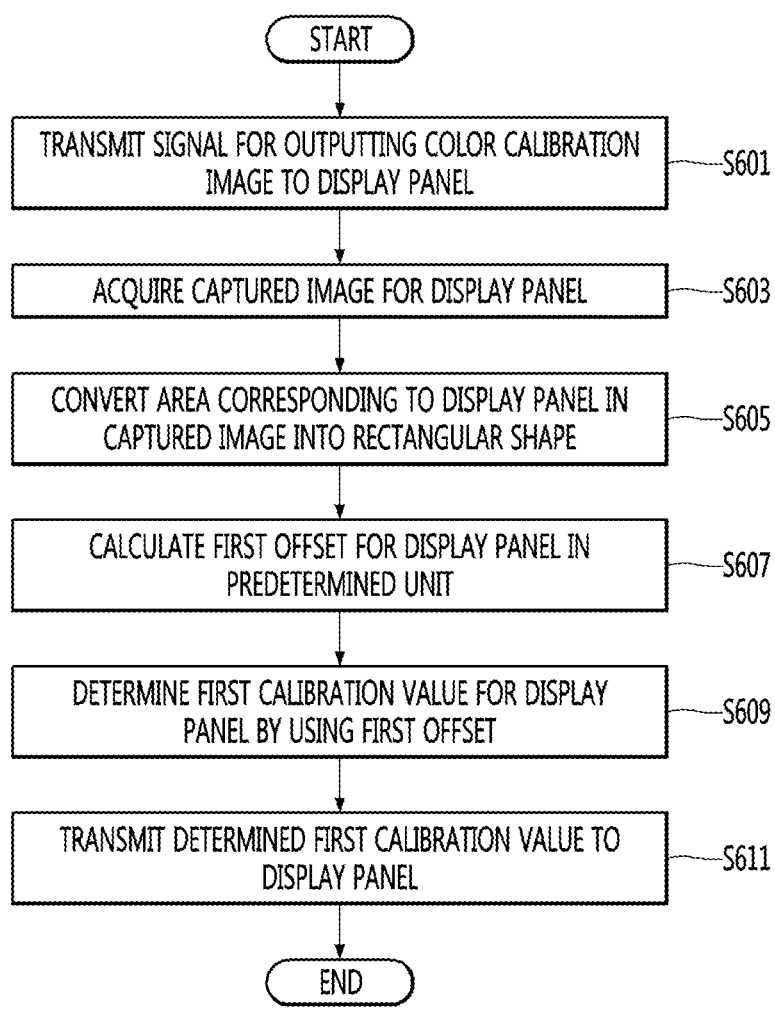
FIG. 6 is a flowchart illustrating a method for calibrating a color of a display panel according to one embodiment.

FIG. 6 is a flowchart illustrating a method for calibrating a color of a display panel according to one embodiment.

Referring to FIG. 6, the processor 180 of the AI apparatus 100 transmits a signal for outputting a color calibration image to the display panel (S601).

The display panel may refer to the display unit 151 included in the AI apparatus 100 or may refer to a display panel of an external display device 300.

The display panel may include various panels such as an LCD panel, an LED panel, and the like.

When the display panel refers to the display unit 151 included in the AI apparatus 100, the processor 180 may directly transmit a signal for outputting a color calibration image to the display unit 151.

When the display panel refers to a display unit included in the external display device 300, the processor 180 may transmit a signal for outputting a color calibration image to the display device 300 through the communication unit 110.

The color calibration image is an image used when calibrating the color of the display panel, and may refer to a monochromatic image which can facilitate the color calibration of the display panel.

Although it is not necessary to output the color calibration image when calibrating the color of the display panel, the color can be calibrated with higher accuracy when the same color is output from all areas of the display panel.

That is, according to the present disclosure, the color can be calibrated without outputting the color calibration image, and thus the present disclosure may cover a method for calibrating the color of the display panel without outputting a separate color calibration image.

In addition, the color calibration image in the present disclosure is not limited only to the monochromatic image. Specifically, in order to determine the color distortion for various colors, the color calibration image may be an image in which all areas have the same color and the color continuously changes over time, or an image in which all areas have different colors.

In a case that the processor 180 of the AI apparatus 100 calibrates the color of the display panel while controlling the color calibration image such that the color calibration image is output to the display panel, the processor 180 of the AI apparatus 100 has information about the output color calibration image.

In a case that the processor 180 of the AI apparatus 100 calibrates the color of the display panel without outputting the color calibration image to the display panel, the image data output to the display panel may be acquired.

In addition, the image output from the display panel and including the color calibration image may be used as a reference image for calibrating the color of the display panel and may be referred to as a first reference image or a color reference image. The data corresponding to the first reference image may be referred to as first reference image data or color reference image data.

In addition, the processor 180 of the AI apparatus 100 acquires a captured image for the display panel through the camera 121 (S603).

The camera 121 may be an RGB camera, and the captured image may be an RGB image. Hereinafter, data corresponding to the captured image may be referred to as captured image data.

The camera 121 may be installed at a fixed position facing the display panel, which is subject to color calibration, with a fixed viewpoint, or may be installed on a body of the AI apparatus 100 with a viewpoint that may change as the AI apparatus 100 moves.

In addition, the processor 180 of the AI apparatus 100 converts an area of the captured image corresponding to the display panel into a rectangular shape (S605).

In a case that the viewpoint of the camera 121 faces the center of the display panel at the height corresponding to the center of the display panel, the display panel included in the captured image may have a rectangular shape. However, if the viewpoint of the camera 121 does not face the center of the display panel at the front of the center of the display panel, the display panel included in the captured image may not be a rectangular shape, such as a rhombus.

When an area of the display panel in the captured image is not rectangular, the processor 180 may convert the captured image such that the area of the display panel has a rectangular shape.

Here, the processor 180 may convert the acquired captured image into a rectangular shape while leaving only an area corresponding to the display panel in the acquired captured image.

Alternatively, the processor 180 may convert the acquired captured image such that the display panel included in the acquired captured image has a rectangular shape, and remove an area except for the area corresponding to the display panel from the converted captured image.

In addition, the processor 180 of the AI apparatus 100 calculates a first offset with respect to the display panel in a predetermined unit by using the captured image and the first reference image (S607).

The predetermined unit for the display panel may include pixels constituting the display panel.

In a case that a plurality of display panels constitute one display panel group, the display panels refer to a display panel group. In this case, the predetermined unit for the display panel (display panel group) may include unit display panels constituting the display panel group.

That is, the color distortion of the display panel may occur between the unit pixels constituting the single display panel and may also occur between the unit display panels constituting the single display panel group.

The first offset may refer to a difference in color or luminance between the captured image and the first reference image, and may be calculated in a predetermined unit. In addition, the first offset may include a difference in color or luminance between a predetermined unit position and a corresponding position.

For example, the processor 180 may determine the first offset corresponding to each unit pixel of the display panel. Alternatively, the processor 180 may determine the first offset corresponding to each unit display panel of the display panel group.

The first offset may refer to a color offset.

The color of the captured image and the color of the first reference image may be expressed by using an HSV model, an RGB model, a YCbCr model, and the like.

Here, the processor 180 may map the first reference image and the captured image, and determine the first offset by using mapping information.

The mapping information may include a setting value corresponding to the first reference image and a measurement value corresponding to the captured image.

In addition, the processor 180 determines a first calibration value for the display panel using the first offset (S609).

The first calibration value refers to a correction/calibration value that is additionally calculated on an input color value or luminance value when the display panel outputs an image, and may be calculated in a predetermined unit. The first calibration value may include a calibration value of color or luminance at a predetermined unit position and a corresponding position.

For example, the processor 180 may determine the first calibration value corresponding to each unit pixel of the display panel. Alternatively, the processor 180 may determine the first calibration value corresponding to each unit display panel of the display panel group.

Here, the first calibration value may be added to the color value or the luminance value input from the display panel, or may be multiplied by the color value or the luminance value or may be collectively added to and multiplied by the color value or the luminance value.

In one embodiment, the processor 180 may calculate first calibration values based on zero. This may refer to a situation in which the display panel is calibrated to output the color and luminance of the reference image as accurately as possible.

For example, if the offset values (0, 1, −2, 5) for four units are included in the first offset, the processor 180 may determine the first calibration value (0, −1, 2, −5) by subtracting the respective offset values with respect to zero.

In one embodiment, the processor 180 may determine the first calibration values based on the average value of the first offsets. This may refer to a situation in which the display panel is calibrated with a minimum calibration value such that the image can be output in all areas without local distortion. However, in this case, the display panel may not accurately output the color and luminance of the reference image, and may output different colors or luminance with a certain deflection.

For example, if the first offset includes offset values (0, 1, −2, 5) for four units, the processor 180 may determine the first calibration value (1, 0, 3, −4) by calculating an average value 1 of the four offset values and subtracting respective offset values from the calculated average.

In addition, the processor 180 of the AI apparatus 100 transmits the determined first calibration value to the display panel (S611).

The calibration value or the first calibration value refers to an output color calibration value of the display panel.

The processor 180 may remove the color distortion by transmitting a first calibration value to the display panel to adjust an output value of the display panel. Alternatively, the processor 180 may transmit the first calibration value to a controller that controls the display panel.

In a case that a calibration value for removing the distortion exists in the display panel, the display panel or the controller of the display panel may reflect the received first calibration value to the existing calibration value.

Alternatively, if there is a history of previously determining the first calibration value, the processor 180 may determine a new first calibration value by reflecting the previously determined first calibration value together with the currently determined first calibration value, and transmit the newly determined first calibration value to the display panel. In this case, the display panel may perform the calibration to remove the color distortion by simply applying the calibration value transmitted from the processor 180 without considering the previous calibration values.

Although FIG. 6 shows only one cycle of calibrating the color of the display panel (S601 to S611), a plurality of cycles may be performed to calibrate the color of the display panel.

More specifically, operations (S601 to S611) of calibrating the color of the display panel may be repeatedly performed, and the repetition may be stopped when the first offset is smaller than a predetermined reference value.

Figure 7:
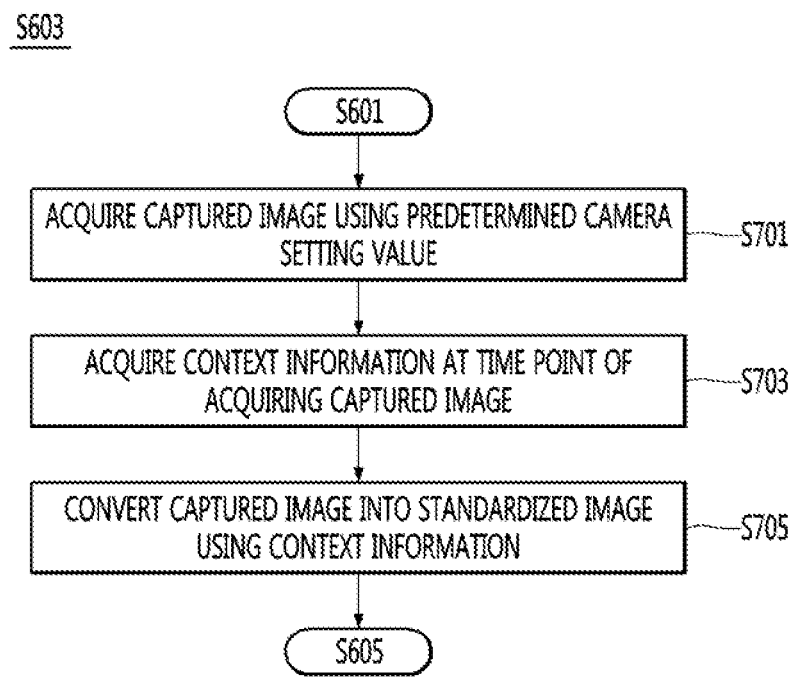
FIG. 7 is a flowchart illustrating an example of a step S603 of acquiring a captured image illustrated in FIG. 6.

FIG. 7 is a flowchart illustrating an example of a step S603 of acquiring a captured image illustrated in FIG. 6.

Referring to FIG. 7, the processor 180 of the AI apparatus 100 acquires the captured image by using a camera setting value predetermined through the camera 121 (S701).

Here, the camera 121 may acquire the captured image by using the same camera setting value always. The camera setting values may include a shutter speed, an aperture, an ISO, a white balance, and the like.

In addition, the processor 180 of the AI apparatus 100 acquires context information at the time of acquiring the captured image (S703).

The context information may include weather information, capturing time point information including a date and time, illuminance information, and the like.

The processor 180 may receive the weather information from the AI server 200 or another external server (not shown) through the communication unit 110.

The processor 180 may receive the capturing time point information from the AI server 200 or another external server (not shown) through the communication unit 110, and may acquire the capturing time point information by using a clock built in the processor 180.

The processor 180 may acquire illuminance information through a sensor unit 140.

In addition, the processor 180 of the AI apparatus 100 converts the captured image into a standardized image using the acquired context information (S705).

The standardized image may refer to a captured image acquired in a situation corresponding to standard context information.

For example, the standardized image may refer to a captured image acquired at a predetermined time point having a predetermined illuminance in fine weather. In this case, the standard context information may include fine weather, a predetermined time point, a predetermined illuminance, and the like.

That is, converting the captured image into the standardized image may refer to calibrating luminance/saturation/color of the captured image or removing noise.

The processor 180 may generate the standardized image from the captured image by using an image conversion model trained using a machine learning algorithm or a deep learning algorithm.

Here, the image conversion model may be a model that outputs the standardized image when the captured image and the context information are input. Alternatively, the image conversion model may be a model that outputs conversion parameters for converting the captured image into the standardized image when context information is input.

Here, the processor 180 may use the image conversion model trained by a learning processor 130 of the AI apparatus 100 or use the image conversion model trained by a learning processor 240 of the AI server 200.

The image conversion model may be stored and used in the memory 170 of the AI apparatus 100 or may be stored and used in the memory 230 of the artificial intelligence server 200.

The image conversion model may be trained using a first reference image.

For example, the image conversion model may include an artificial neural network, and output an image acquired by converting the first reference image when the context information and the first reference image are input. In addition, a cost function may be a function indicating a difference between an image, which is acquired by capturing the first reference image in an environment corresponding to the standard context information, and a converted image. In this case, the image conversion model may be trained to convert any context information to be closest to the image captured in the environment corresponding to the standard context information.

Figure 8:
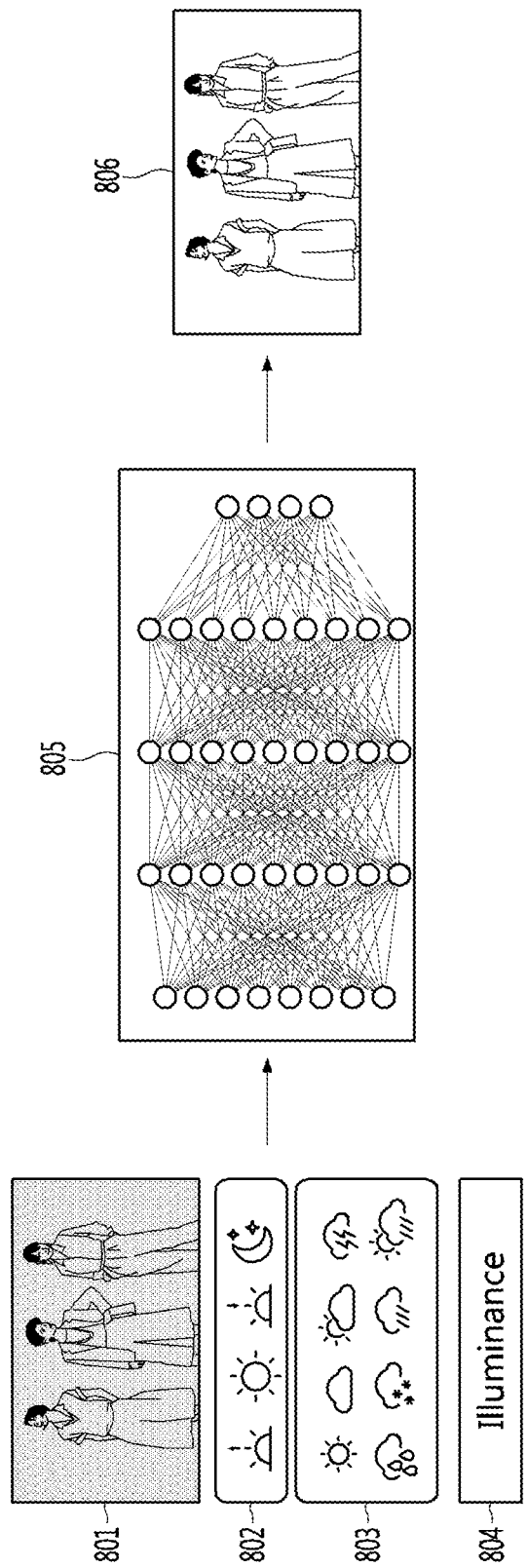
FIG. 8 is a view illustrating an image conversion model according to one embodiment.

FIG. 8 is a view illustrating an image conversion model according to one embodiment.

Referring to FIG. 8, the image conversion model 805 may be configured as an artificial neural network.

The image conversion model 805 may output a standardized image 806 when the captured image 801 acquired by capturing the display panel and context information 802, 803, and 804 at the capturing time point are input.

The context information may include time information 802, weather information 803, illuminance information 804, and the like.

As described above, the image conversion model 805 may be trained using the first reference image.

In detail, the image conversion model 805 may be trained to convert the image acquired by capturing the first reference image in various situations to be closest to the image acquired by capturing the first reference image in a situation corresponding to the standard context information. In this case, the cost function of the artificial neural network may be a function representing a difference between the converted image and the image captured in a situation corresponding to the standard context information.

Figure 9:
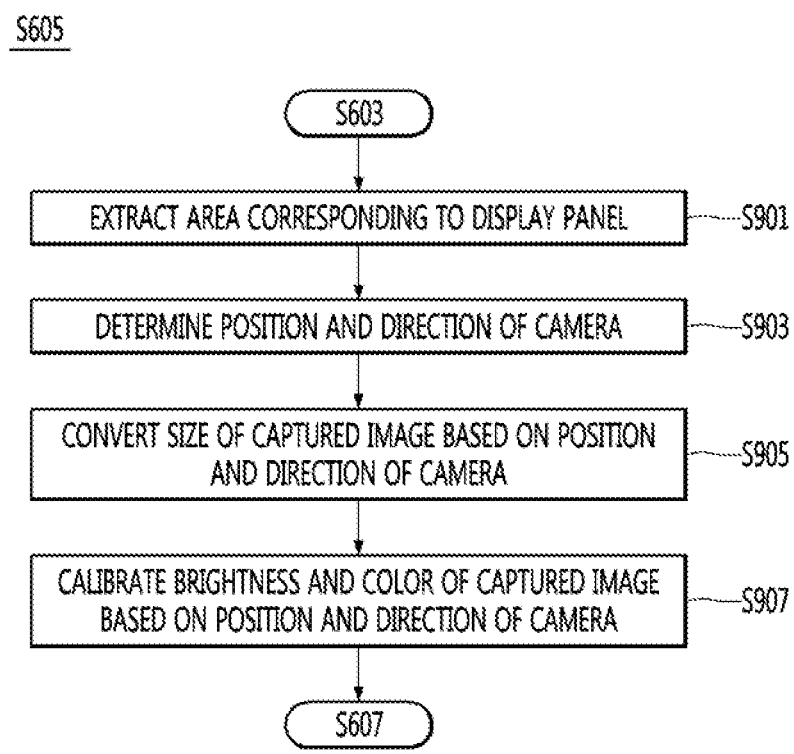
FIG. 9 is a flowchart illustrating an example of a step S605 of converting an area corresponding to a display panel in a captured image into a rectangular shape illustrated in FIG. 6.

FIG. 9 is a flowchart illustrating an example of a step S605 of converting an area corresponding to the display panel into a rectangular shape in the captured image illustrated in FIG. 6.

Referring to FIG. 9, the processor 180 of the AI apparatus 100 extracts an area corresponding to the display panel from the acquired captured image (S901).

Here, the processor 180 may extract an area corresponding to the display panel by recognizing the first reference image from the acquired captured image and determining the range.

However, since the first reference image is included in the acquired captured image in a distorted state, an area corresponding to the display panel may be extracted based on a certain degree of similarity.

Here, the processor 180 may extract an area corresponding to the display panel from the acquired captured image by using an object recognition model composed of an artificial neural network trained using a machine learning algorithm or a deep learning algorithm.

For example, the object recognition model may include a convolutional neural network (CNN).

In addition, the processor 180 of the AI apparatus 100 determines the position and the capturing direction of the camera 121 based on the extracted area (S903).

The position of the camera 121 may refer to a position relative to the display panel.

For example, if the extracted area corresponding to the display panel has a rectangular shape, the processor 180 may determine that the camera 121 is located at the front of the center of the display panel and faces the display panel.

In addition, if the extracted area corresponding to the display panel has a rhombus shape, the processor 180 may determine that the camera 121 is located at a central horizontal axis or a central vertical axis with respect to the display panel, and faces the display panel in the central horizontal axis direction or the center vertical axis direction.

In addition, the processor 180 of the AI apparatus 100 converts the size of the captured image in consideration of the position and the capturing direction of the camera (S905).

The size of the captured image does not refer to the size of a file, but refer to the size of the image, such as the width or length.

The processor 180 may convert the size of the captured image in consideration of the position and the capturing direction of the camera 121 such that the area corresponding to the display panel included in the captured image has a rectangular shape. That is, the captured image is generated in a situation that the camera 121 faces the display panel at the front of the center of the display panel.

In addition, the processor 180 of the AI apparatus 100 calibrates the color and luminance of the captured image in consideration of the position and the capturing direction of the camera (S907).

When the size of the captured image is changed according to step S905, an enlarged area or a reduced area may occur. The color or luminance may be distorted in size-variable areas, such as enlarged areas or reduced areas, so correction is required.

Also, when the viewpoint of the camera 121 is shifted to the front of the center of the display panel, the distance from the camera 121 to each point (for example, the pixels) of the display panel may be changed, and thus, it is necessary to correct the luminance for each pixel in the area corresponding to the display panel included in the captured image.

Therefore, the processor 180 determines a relative position between the camera 121 and the display panel based on the shape of an area corresponding to the display panel included in the acquired captured image, and calibrates the color and luminance of each pixel based on the determined relative position when converting the captured image.

In one embodiment, the operation of converting the size of the captured image (S905) and the operation of calibrating the color and luminance of the captured image (S907) may be performed in parallel.

In one embodiment, the operation of calibrating the color and luminance of the captured image (S907) may be performed first, and then the operation of converting the size of the captured image (S905) may be performed.

Figure 10:
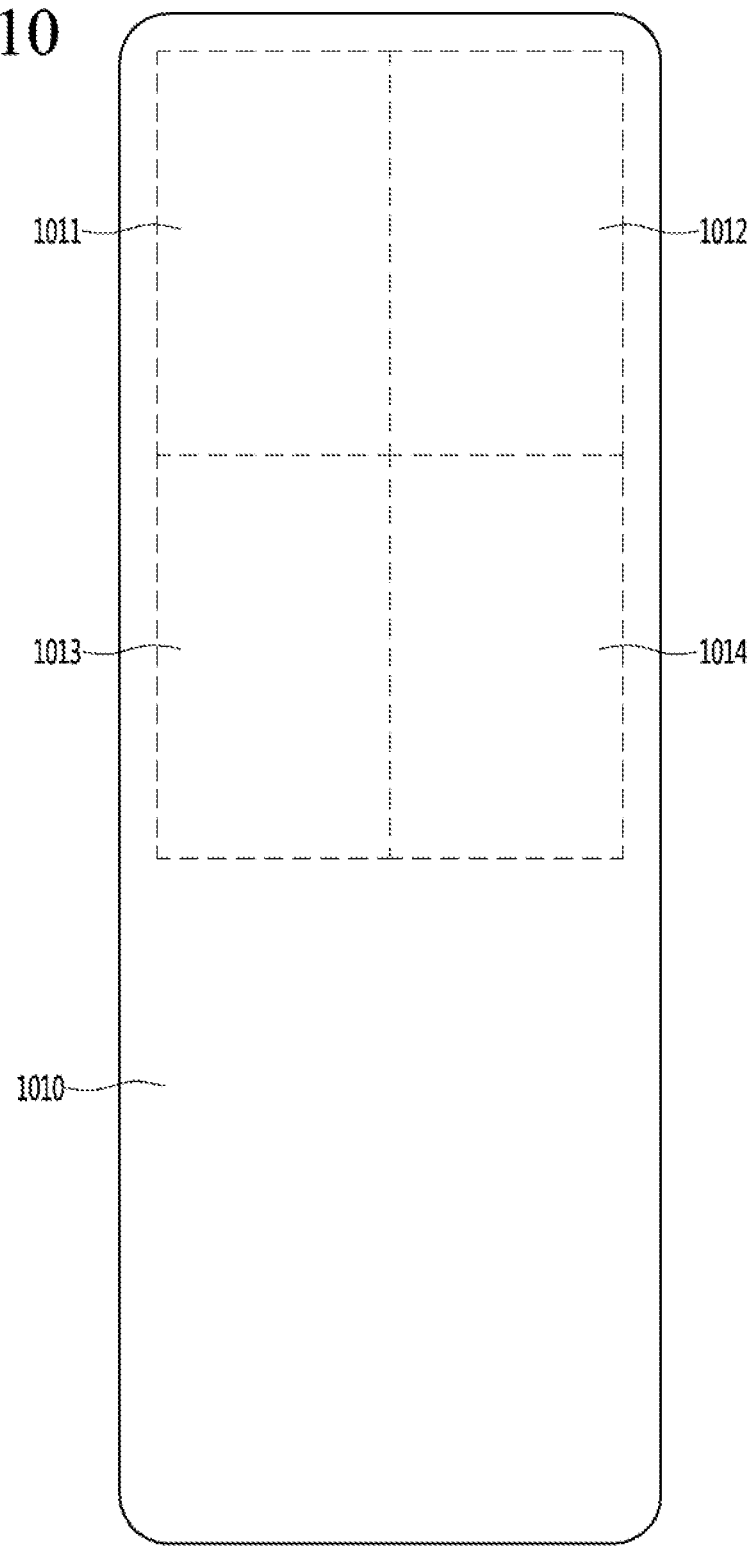
FIG. 10 is a view illustrating a display device according to one embodiment.

FIG. 10 is a view illustrating a display device according to one exemplary embodiment.

Referring to FIG. 10, the display device 910 may include one display panel group including a plurality of display panels 1011, 1012, 1013, and 1014.

Although FIG. 10 illustrates the display device 1010 as a digital signage, the present invention is not limited thereto.

In addition, although the display device 1010 illustrated in FIG. 10 is configured such that a plurality of display panels constitute one display panel group, the present invention is not limited thereto.

Figure 11:
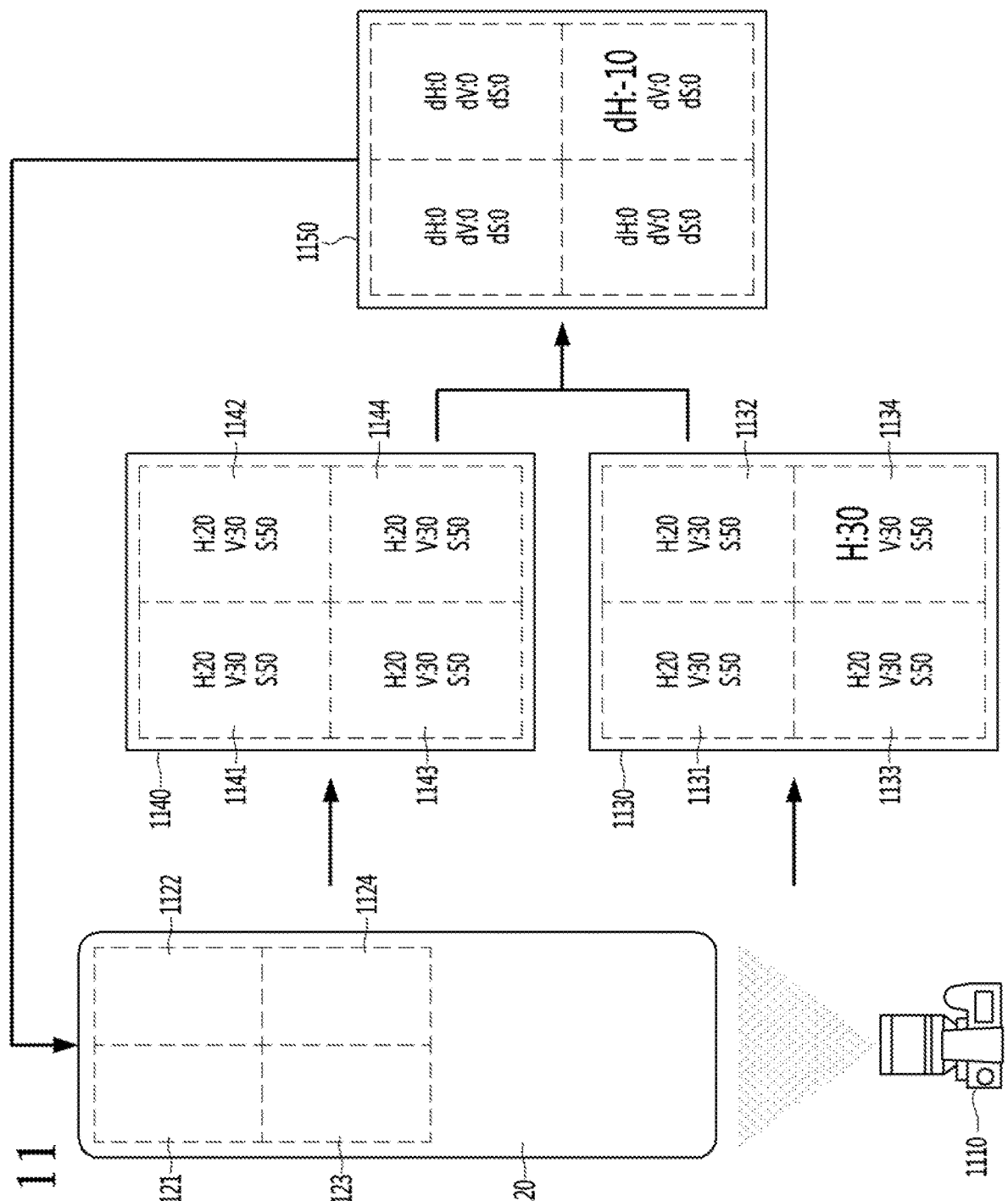
FIG. 11 is a view illustrating a method for calibrating a color of a display panel according to one.

FIG. 11 is a view illustrating a method for removing color distortion of a display panel according to one embodiment.

Referring to FIG. 11, the camera 1110 of the AI apparatus 100 captures an image of the display device 1120, which may be referred to as the captured image as described above.

In the display device 1120, a plurality of display panels 1121, 1122, 1123, and 1124 constitute one display panel group.

The AI apparatus 100 may transmit a control signal to output a first reference image 1140 for color calibration with respect to the display device 1120 and may output the first reference image 1140. The first reference image may be a monochromatic image having Hue 20, Value 30, and Saturation 50 in all areas 1141, 1142, 1143, and 1144. The areas may refer to image areas corresponding to the unit display panels 1121, 1122, 1123, and 1124.

However, the captured image 1130 acquired by the camera 1110 of the AI apparatus 100 may be different from the first reference image 1140.

In detail, among the four areas 1131, 1132, 1133, and 1134, color values (H: 20, V: 30, S: 50) the same as the color values of first to third areas 1141, 1142, and 1143 of the first reference image 1140 are measured in the first area 1131, the second area 1132, and the third area 1133, but color values (H: 30, V: 30, and S: 50) different from the color values of a fourth area 1144 of the first reference image 1140 may be measured in the fourth area 1134.

That is, the processor 180 of the AI apparatus 100 may recognize that the Hue value in the fourth area 1134 of the captured image 1130 is 30, which is higher than the hue value in the fourth area 1144 of the reference image 1140 by 10, so the processor 180 of the AI apparatus 100 may calculate the first offset.

In the example of FIG. 11, the processor 180 of the AI apparatus 100 may express the first offset as an ordered pair of difference values of H (Hue), V (Value), and S (Saturation) between the captured image 1130 and the first reference image 1140.

Here, the processor 180 of the AI apparatus 100 may calculate offset values corresponding to the areas 1131, 1132, 1133, and 1134 of the captured image 1130 as the first offset.

For example, the processor 180 of the AI apparatus 100 may calculate the first offset as {(0, 0, 0), (0, 0, 0), (0, 0, 0), (10, 0, 0)}.

In addition, the processor 180 of the AI apparatus 100 may determine a first calibration value 1150 in consideration of the calculated first offset.

The first calibration value 1150 is for calibrating the colors of the display panels 1121, 1122, 1123, and 1124 of the display device 1120. In the example of FIG. 11, the first calibration value may be expressed as (dH, dS, dV) which are calibration values of the H, S, and V for display panels 1121, 1122, 1123 and 1124.

For example, the processor 180 of the AI apparatus 100 may determine the first calibration value 1150 as {(0, 0, 0), (0, 0, 0), (0, 0, 0), (−10, 0, 0)} in consideration of the calculated first offset {(0, 0, 0), (0, 0, 0), (0, 0, 0), (10, 0, 0)}.

In addition, the processor 180 of the AI apparatus 100 transmits the determined first calibration value 1150 to the display device 1120 to correct/calibrate the H, V and S by the first calibration value 1150 when outputting the image from the display panels 1121, 1122, 1123, and 1124.

In the example of FIG. 11, the display device 1120 adds the first calibration value 1150 to the output values H, V and S, but the present invention is not limited thereto.

That is, in another embodiment, the H, V and S may be multiplied by the first calibration value 1150 as well as added to the first calibration value 1150, or may only be multiplied by the first calibration value 1150.

For example, in the example of the captured image 1130 and the first reference image 1140 of FIG. 11, the processor 180 of the AI apparatus 100 may determine the first calibration value as {(1, 1, 1), (1, 1, 1), (1, 1, 1), (⅔, 1, 1)}, which may refer to multiplying the output H, V, and S by the calibration value.

Figure 12:
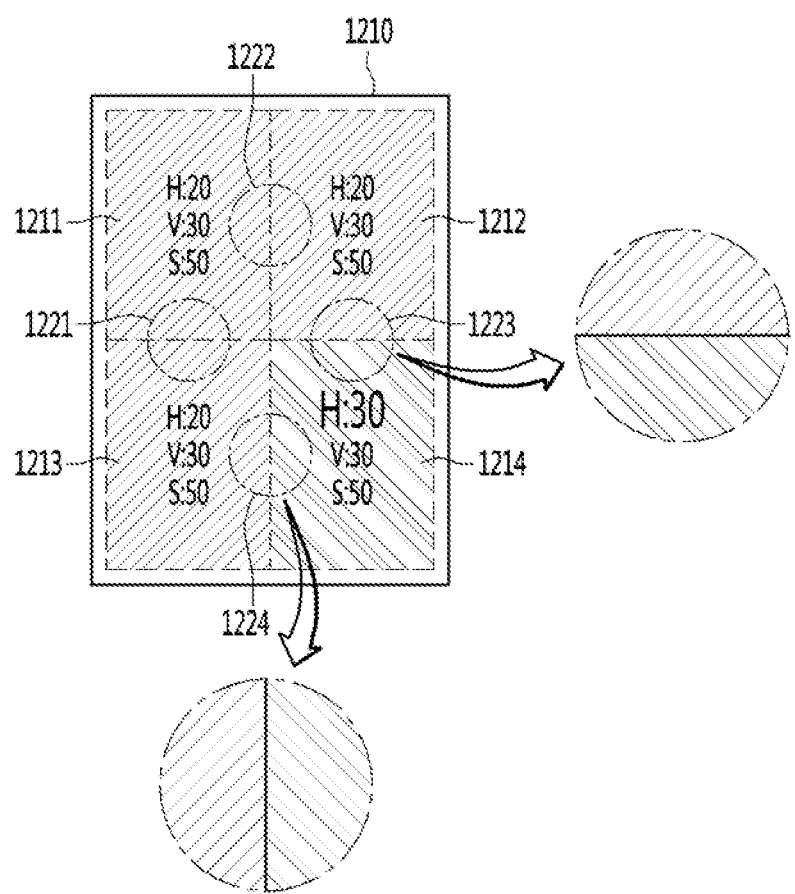
FIG. 12 is a view illustrating a method for determining an area where color distortion occurs according to one embodiment.

FIG. 12 is a view illustrating a method for determining an area where color distortion occurs according to one embodiment.

Referring to FIG. 12, the captured image 1210 acquired by capturing the display device 300 using the camera 121 of the AI apparatus 100 includes a plurality of areas 1211, 1212, 1213 and 1214 since a plurality of display panels constitute one display panel group.

Here, the processor 180 of the AI apparatus 100 observes boundary areas 1221, 1222, 1223, and 1224 of each area in the captured image 1210, and may determine whether the color distortion occurs by comparing the fourth area 1214 with the first to third areas 1211, 1212, and 1213 based on the boundary areas 1223 and 1224 in which the color difference occurs.

FIGS. 10 to 12 illustrate examples of a display device 1010 or 1120 in which a plurality of display panels constitute one display panel group. The processor 180 of the AI apparatus 100 may receive information about the configuration and layout of the display panels from the display device 1010 or 1120 to use the information.

Also, FIGS. 10 to 12 illustrate examples of a display device 1010 or 1120 in which a plurality of display panels constitute one display panel group. However, as described above, the present disclosure is not limited thereto, and the calibration for removing the color distortion for a predetermined unit such as a pixel unit may be performed with respect to the display device including a single display panel.

Figure 13:
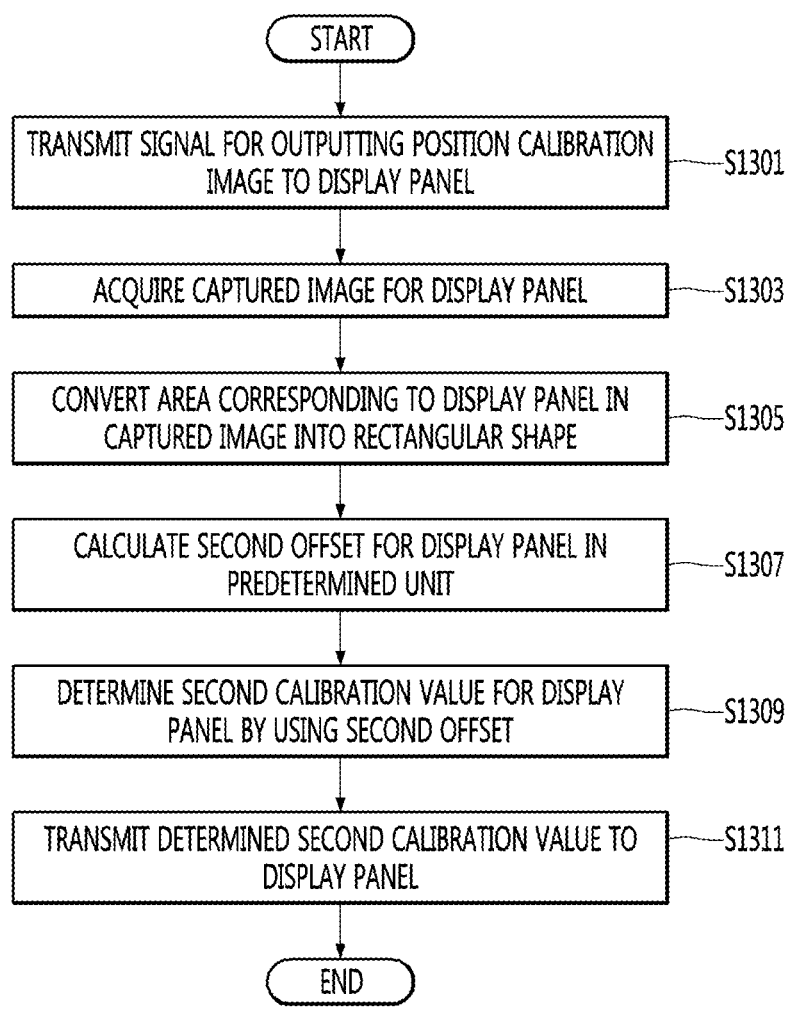
FIG. 13 is a flowchart illustrating a method for calibrating an output position of a display panel according to one embodiment.

FIG. 13 is a flowchart illustrating a method for calibrating an output position of a display panel according to one embodiment.

Referring to FIG. 13, the processor 180 of the AI apparatus 100 transmits a signal for outputting a position calibration image to a display panel (S1301).

The display panel may refer to a display unit 151 included in the AI apparatus 100 or may refer to a display panel of the external display device 300.

The display panel may include various panels such as an LCD panel, an LED panel and the like.

When the display panel refers to the display unit 151 included in the AI apparatus 100, the processor 180 may directly transmit a signal for outputting a position calibration image to the display unit 151.

When the display panel refers to the display unit included in the external display device 300, the processor 180 may transmit a signal for outputting a position calibration image to the display device 300 through the communication unit 110.

The position calibration image may be an image used when calibrating the output position of the display panel, and may refer to an image including a monochromatic background and another monochromatic lattice lines to facilitate the calibration of the output position of the display panel.

It is not necessary to output the position calibration image when calibrating the output position of the display panel, but the output position may be calibrated with higher accuracy when outputting the lattice lines to the display panel.

That is, the present invention may calibrate the output position without outputting the position calibration image. Therefore, the present disclosure covers a method for calibrating the output position of the display panel without outputting a separate position calibration image.

In a case that the processor 180 of the AI apparatus 100 calibrates the output position of the display panel while controlling the position calibration image such that the position calibration image is output to the display panel, the processor 180 of the AI apparatus 100 has information about the output position calibration image.

In a case that the processor 180 of the AI apparatus 100 calibrates the output position of the display panel without outputting the position calibration image to the display panel, the image data output to the display panel may be acquired.

In addition, the image output from the display panel and including the position calibration image may be used as a reference image for calibrating the output position of the display panel and may be referred to as a second reference image or a position reference image. The data corresponding to the second reference image may be referred to as second reference image data or position reference image data.

In addition, the processor 180 of the AI apparatus 100 acquires a captured image for the display panel through the camera 121 (S1303).

The camera 121 may be an RGB camera, and the captured image may be an RGB image. Hereinafter, data corresponding to the captured image may be referred to as captured image data.

The camera 121 may be installed at a fixed position facing the display panel, which is subject to the position calibration, with a fixed viewpoint, or may be installed on a body of the AI apparatus 100 with a viewpoint that may change as the AI apparatus 100 moves.

Step S1303 is the same as step S603 for acquiring the captured image illustrated in FIG. 6. Therefore, the description with respect to FIG. 7 may be applied to step S1303.

In addition, the processor 180 of the AI apparatus 100 converts an area of the captured image corresponding to the display panel into a rectangular shape (S1305).

In a case that the viewpoint of the camera 121 faces the center of the display panel at the height corresponding to the center of the display panel, the display panel included in the captured image may have a rectangular shape. However, if the viewpoint of the camera 121 does not face the center of the display panel at the front of the center of the display panel, the display panel included in the captured image may not be a rectangular shape, such as a rhombus.

When an area of the display panel in the captured image is not rectangular, the processor 180 may convert the captured image such that the area of the display panel has a rectangular shape.

Here, the processor 180 may convert the acquired captured image into a rectangular shape while leaving only an area corresponding to the display panel in the acquired captured image.

Alternatively, the processor 180 may convert the acquired captured image such that the display panel included in the acquired captured image has a rectangular shape, and remove an area except for the area corresponding to the display panel from the converted captured image.

Step S1305 is the same as step S605 for acquiring the captured image illustrated in FIG. 6. Therefore, the description with respect to FIG. 9 may be applied to step S1305.

In addition, the processor 180 of the AI apparatus 100 calculates a second offset with respect to the display panel in a predetermined unit by using the captured image and the second reference image (S1307).

The predetermined unit for the display panel may include pixels constituting the display panel.

In a case that a plurality of display panels constitute one display panel group, the display panels refer to a display panel group. In this case, the predetermined unit for the display panel (display panel group) may include unit display panels constituting the display panel group.

That is, the position distortion of the display panel may occur between the unit pixels constituting the single display panel and may also occur between the unit display panels constituting the single display panel group.

The second offset may refer to a difference in output position between the captured image and the second reference image, and may be calculated in a predetermined unit. In addition, the second offset may include a difference in output position between a predetermined unit position and a corresponding position.

For example, the processor 180 may determine the second offset corresponding to each unit pixel of the display panel. Alternatively, the processor 180 may determine the second offset corresponding to each unit display panel of the display panel group.

The second offset may refer to an output position offset.

In addition, the second offset may be expressed as an ordered pair of an x-coordinate and a y-coordinate.

Here, the processor 180 may map the second reference image and the captured image, and determine the second offset by using mapping information.

The mapping information may include a setting value corresponding to the second reference image and a measurement value corresponding to the captured image.

In addition, the processor 180 determines a second calibration value for the display panel using the second offset (S1309).

The second calibration value refers to a correction/calibration value that is additionally calculated on an input output position value when the display panel outputs an image, and may be calculated in a predetermined unit. The second calibration value may include an output position calibration value at a predetermined unit position and a corresponding position.

For example, the processor 180 may determine the second calibration value corresponding to each unit pixel of the display panel. Alternatively, the processor 180 may determine the second calibration value corresponding to each unit display panel of the display panel group.

Here, the second calibration value may be added to the output position value input from the display panel, or may be multiplied by the output position value or may be collectively added to and multiplied by the output position value.

In one embodiment, the processor 180 may calculate second calibration values based on zero. This may refer to a situation in which the display panel is calibrated to output the output position of the reference image as accurately as possible.

For example, if the offset values $\{(0, 0), (1, -2), (-2, 1), (5, 1)\}$ for four units are included in the second offset, the processor 180 may determine the second calibration values $\{(0, 0), (-1, 2), (2, -1), (-5, -1)\}$ by subtracting the respective offset values with respect to zero.

In one embodiment, the processor 180 may determine the second calibration values based on the average value of the second offsets. This may refer to a situation in which the display panel is calibrated with a minimum calibration value such that the image can be output in all areas without local distortion. However, in this case, the display panel may not accurately output the reference image at the center thereof, but output the reference image at a biased position with a certain deflection.

For example, if the second offset includes offset values $\{(0, 0), (1, -2), (-2, 1), (5, 1)\}$ for four units, the processor 180 may determine the second calibration value $\{(1, 0), (0, 2), (3, -1), (-4, -1)\}$ by calculating an average value $(1, 0)$ of the four offset values and subtracting respective offset values from the calculated average.

In addition, the processor 180 of the AI apparatus 100 transmits the determined second calibration value to the display panel (S1311).

The calibration value or the second calibration value refers to an output position calibration value of the display panel.

The processor 180 may remove the distortion of the output position by transmitting the second calibration value to the display panel to calibrate the output position of the display panel. Alternatively, the processor 180 may transmit the second calibration value to a controller that controls the display panel.

In a case that a calibration value for removing the distortion exists in the display panel, the display panel or the controller of the display panel may reflect the received second calibration value to the existing calibration value.

Alternatively, if there is a history of previously determining the second calibration value, the processor 180 may determine a new second calibration value by reflecting the previously determined second calibration value together with the currently determined second calibration value, and transmit the newly determined second calibration value to the display panel. In this case, the display panel may perform the calibration to remove the position distortion by simply applying the calibration value transmitted from the processor 180 without considering the previous calibration values.

Although FIG. 13 shows only one cycle of calibrating the output position of the display panel (S1301 to S311), a plurality of cycles may be performed to calibrate the output position of the display panel.

More specifically, operations (S1301 to S1311) of calibrating the output position of the display panel may be repeatedly performed, and the repetition may be stopped when the second offset is smaller than a predetermined reference value.

Figure 14:
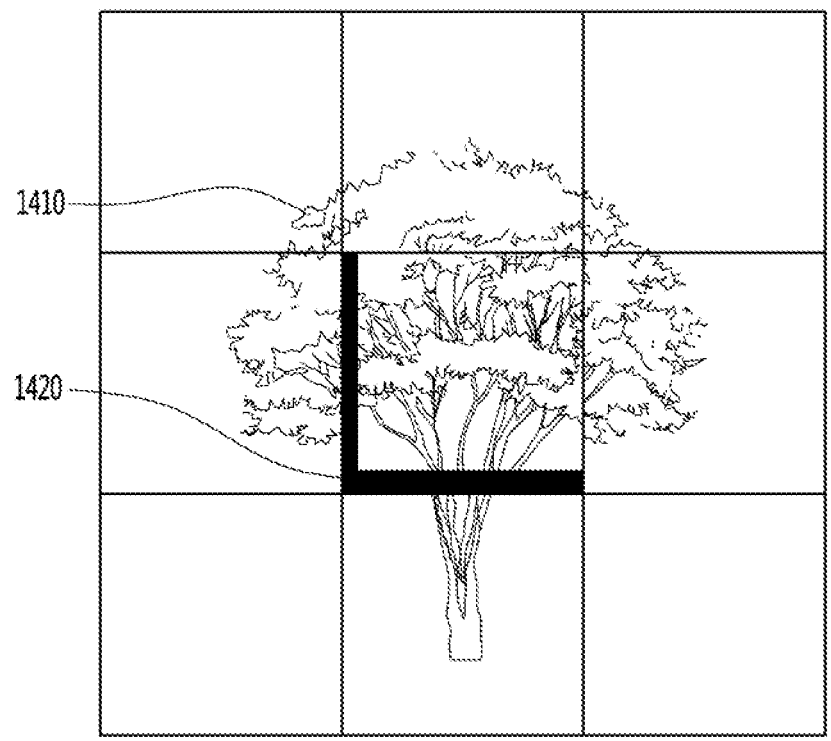
FIG. 14 is a view illustrating distortion of an output position of a display panel according to one embodiment.

FIG. 14 is a view illustrating distortion of an output position of a display panel according to one embodiment.

Referring to FIG. 14, a display panel may be connected to a plurality of unit display panels (for example, nine unit display panels) to form one display panel group.

Even if each unit display panel is arranged in a physically unaligned state, or even if each unit display panel is connected in a physically aligned state, distortion 1420 may occurs in the output position of an output image 1410 due to the error of elements or the settings of software Although FIG. 14 illustrates the distortion of the output position generated when a plurality of unit display panels are connected to each other to form a display panel group, the distortion of the output position may occur between unit display elements in a single unit display panel.

Figure 15:
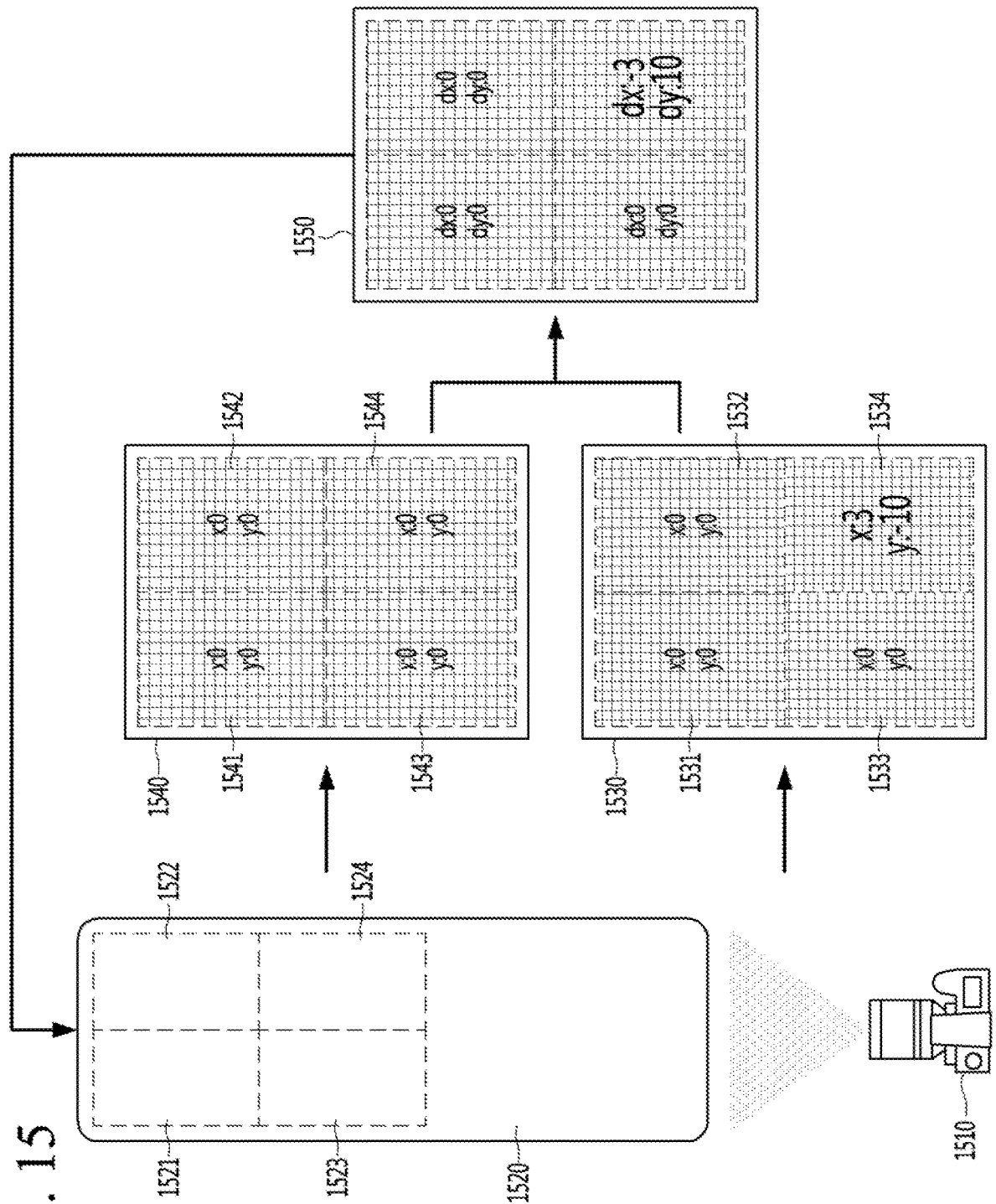
FIG. 15 is a view illustrating a method for removing distortion of an output position of a display panel according to one embodiment.

FIG. 15 is a view illustrating a method for removing the distortion of the output position of the display panel according to one embodiment.

Referring to FIG. 15, a camera 1510 of the AI apparatus 100 captures an image of a display device 1520, which may be referred to as the captured image described above.

In the display device 1520, a plurality of display panels 1521, 1522, 1523, and 1524 constitute one display panel group.

The AI apparatus 100 may transmit a control signal to output a second reference image 1540 for calibrating the output position with respect to the display device 1520, and may output the second reference image 1540. The second reference image may be an image having the same lattice pattern in all areas 1541, 1542, 1543, and 1544. The areas may refer to image areas corresponding to the unit display panels 1521, 1522, 1523, and 1524.

However, the captured image 1530 acquired by the camera 1510 of the AI apparatus 100 may be different from the second reference image 1540.

In detail, among the four areas 1531, 1532, 1533, and 1534, the lattice pattern may be connected between the first area 1531, the second area 1532, and the third area 1533 without distortion. However, in the fourth area 1534, the lattice pattern may be connected between the second area 1532 and the third area 1533 while generating the distortion.

That is, the processor 180 of the AI apparatus 100 may recognize that an output position value in the fourth area 1534 of the captured image 1530 is changed from an output position value in the fourth area 1544 of the reference image 1540 by (3, −10) so that the processor 180 of the AI apparatus 100 may calculate the second offset.

In the example of FIG. 15, the processor 180 of the AI apparatus 100 may express the second offset as an ordered pair of difference values of output positions between the captured image 1530 and the second reference image 1540.

Here, the processor 180 of the AI apparatus 100 may calculate offset values corresponding to the areas 1531, 1532, 1533, and 1534 of the captured image 1530 as the second offset.

For example, the processor 180 of the AI apparatus 100 may calculate the second offset as {(0, 0), (0, 0), (0, 0), (3, −10)}.

In addition, the processor 180 of the AI apparatus 100 may determine the second calibration value 1550 in consideration of the calculated second offset.

The second calibration value 1550 is for correcting the output position of the display panels 1521, 1522, 1523, and 1524 of the display device 1520. In the example of FIG. 15, the second calibration value may be expressed as (dx, dy) which are calibration values of the output position (x, y) with respect to the display panels 1521, 1522, 1523 and 1524.

For example, the processor 180 of the AI apparatus 100 may determine the second offset value 1550 as {(0, 0), (0, 0), (0, 0), (−3, 10)} in consideration of the calculated second offset {(0, 0), (0, 0), (0, 0), (3, −10)}.

In addition, the processor 180 of the AI apparatus 100 may transmit the determined second calibration value 1550 to the display device 1520 to correct/calibrate the position values (x, y) by the second calibration value 1550 when outputting the image from the display panels 1521, 1522, 1523, and 1524.

In the example of FIG. 15, the display device 1520 adds the second calibration value 1550 to the output position values (x, y), but the present invention is not limited thereto.

That is, in another embodiment, the output position values (x, y) may be multiplied by the second calibration value 1550 as well as added to the second calibration value 1550, or may only be multiplied by the second calibration value 1550.

Figure 16:
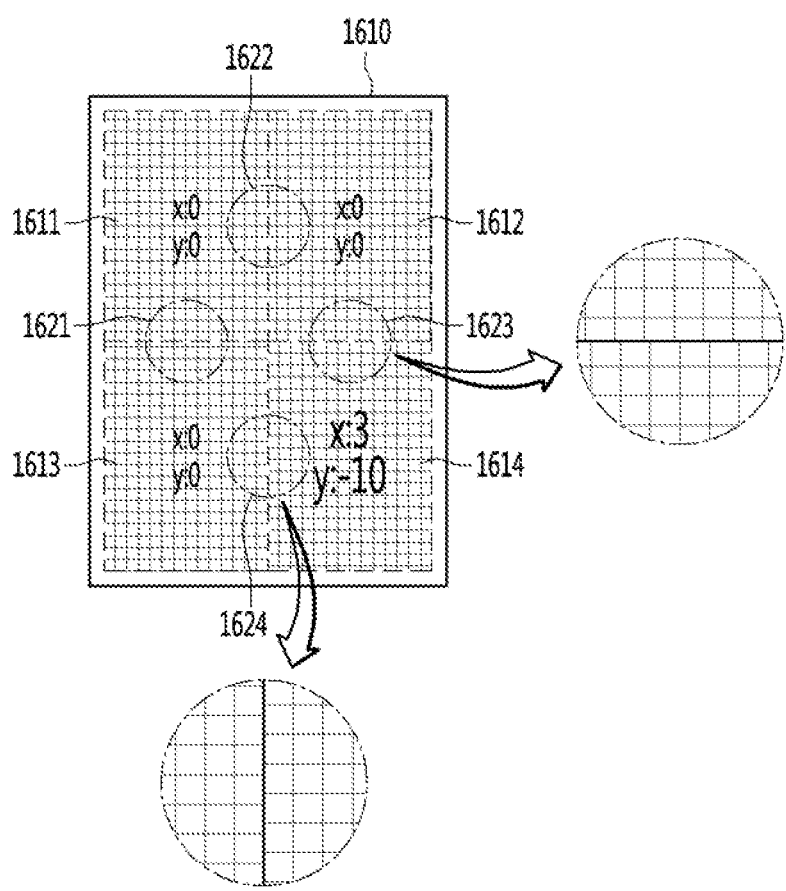
FIG. 16 is a view illustrating a method for determining an area where output position distortion occurs according to one embodiment.

FIG. 16 is a view illustrating a method for determining an area in which the output position distortion occurs according to one embodiment.

Referring to FIG. 16, since a plurality of display panels constitute one display panel group, the captured image 1610 captured by the camera 121 of the AI apparatus 100 may include a plurality of areas 1611, 1612, 1613, and 1614.

Here, the processor 180 of the AI apparatus 100 observes boundary areas 1621, 1622, 1623, and 1624 of each area in the captured image 1610, and may determine whether the color distortion occurs by comparing the fourth area 1614 with the first to third areas 1611, 1612, and 1613 based on the boundary areas 1623 and 1624 in which the lattice pattern is not connected.

FIGS. 15 and 16 illustrate examples of a display device 1510 in which a plurality of display panels constitute one display panel group. The processor 180 of the AI apparatus 100 may receive information about the configuration and layout of the display panels from the display device 1510 to use the information.

In addition, FIGS. 15 and 16 illustrate examples of the display device 1510 in which a plurality of display panels constitute one display panel group. However, as described above, the present disclosure is not limited thereto, and the calibration for removing the output position distortion for a predetermined unit such as a pixel unit may be performed with respect to the display device including a single display panel.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for calibrating a color of a display panel, the artificial intelligence apparatus comprising:
   a communication unit configured to communicate with an external device;
   a camera; and
   a processor configured to:
   transmit a signal for outputting a color reference image to the display panel, receive an image, captured via the camera, of the color reference image being displayed by the display panel;
receive, via the communication unit, context information corresponding to a capturing time point of the captured image;
convert the captured image into a standardized image based on predetermined standard context information of the received context information, wherein the context information includes time information, weather information, and illuminance information, and wherein the predetermined standard context information includes a predetermined time point having a predetermined luminance in a predetermined weather;
calculate a color offset for the display panel with respect to a predetermined unit of the display panel based on the color reference image and the standardized image,
determine an output color calibration value for the display panel using the calculated color offset, and
cause the display panel to be calibrated based on the determined output color calibration value.

2. The artificial intelligence apparatus according to claim 1, wherein the processor is configured to convert the captured image into the standardized image using an image conversion model, and
wherein the image conversion model is trained by using a machine learning algorithm or a deep learning algorithm.

3. The artificial intelligence apparatus according to claim 2, wherein the image conversion model includes an artificial neural network and outputs the standardized image corresponding to the standard context information when the captured image and the context information are input.

4. The artificial intelligence apparatus according to claim 1, wherein the processor is configured to calculate the color offset by subtracting a color value of the captured image from a color value of the color reference image in a predetermined unit.

5. The artificial intelligence apparatus according to claim 4, wherein the processor is configured to determine the output color calibration value by subtracting each color offset from an average of all color offsets.

6. The artificial intelligence apparatus according to claim 4, wherein the processor is configured to determine the output color calibration value by subtracting each color offset from 0.

7. The artificial intelligence apparatus according to claim 1, wherein the processor is configured to repeatedly perform a process of calibrating the color of the display panel.

8. The artificial intelligence apparatus according to claim 1, wherein the color reference image includes an image having the same color value in all areas.

9. The artificial intelligence apparatus according to claim 8, wherein the color reference image includes an image having a color value that changes over time.

10. The artificial intelligence apparatus according to claim 1, wherein the display panel is formed by a single unit display panel or a plurality of unit display panels connected to each other.

11. The artificial intelligence apparatus according to claim 10, wherein the predetermined unit is the unit display panel or a unit display element included in the display panel.

12. The artificial intelligence apparatus according to claim 11, wherein the display panel includes a flexible display panel, and
wherein the predetermined unit is a unit display element of the flexible display panel.

13. A method for calibrating a color of a display panel, the method comprising:
transmitting a signal for outputting a color reference image to the display panel;
receiving a captured image of the color reference image being displayed by the display panel;
receiving context information corresponding to a capturing time point of the captured image;
converting the captured image into a standardized image based on predetermined standard context information of the received context information, wherein the context information includes time information, weather information, and illuminance information, and wherein the predetermined standard context information includes a predetermined time point having a predetermined luminance in a predetermined weather;
calculating a color offset for the display panel with respect to a predetermined unit of the display panel based on the color reference image and the standardized image;
determining an output color calibration value for the display panel using the calculated color offset; and
causing the display panel to be calibrated based on the determined output color calibration value.

14. A machine-readable non-transitory medium having stored thereon machine-executable instructions for calibrating a color of a display panel, the instructions comprising:
transmitting a signal for outputting a color reference image to the display panel;
receiving a captured image of the color reference image being displayed by the display panel;
receiving context information corresponding to a capturing time point of the captured image;
converting the captured image into a standardized image based on predetermined standard context information of the received context information, wherein the context information includes time information, weather information, and illuminance information, and wherein the predetermined standard context information includes a predetermined time point having a predetermined luminance in a predetermined weather;
calculating a color offset for the display panel with respect to a predetermined unit of the display panel based on the color reference image and the standardized image;
determining an output color calibration value for the display panel using the calculated color offset; and
causing the display panel to be calibrated based on the determined output color calibration value.

* * * * *